(12) United States Patent
Zhang et al.

(10) Patent No.: US 12,337,650 B2
(45) Date of Patent: Jun. 24, 2025

(54) CONNECTING DEVICE AND INTEGRATED ASSEMBLY

(71) Applicant: ZHEJIANG SANHUA AUTOMOTIVE COMPONENTS CO., LTD., Zhejiang (CN)

(72) Inventors: Rongrong Zhang, Zhejiang (CN); Jianmin Zhang, Zhejiang (CN); Shifeng Hu, Zhejiang (CN); Kezhe Qian, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 78 days.

(21) Appl. No.: 18/555,531

(22) PCT Filed: Apr. 15, 2022

(86) PCT No.: PCT/CN2022/087031
§ 371 (c)(1),
(2) Date: Oct. 15, 2023

(87) PCT Pub. No.: WO2022/218403
PCT Pub. Date: Oct. 20, 2022

(65) Prior Publication Data
US 2024/0042825 A1    Feb. 8, 2024

(30) Foreign Application Priority Data
Apr. 16, 2021 (CN) .......................... 202110409751.9

(51) Int. Cl.
*B60H 1/00* (2006.01)
*B60H 1/32* (2006.01)

(52) U.S. Cl.
CPC ..... *B60H 1/00571* (2013.01); *B60H 1/00321* (2013.01); *B60H 1/3229* (2013.01); *B60H 1/00485* (2013.01)

(58) Field of Classification Search
CPC ............ B60H 1/00485; B60H 1/00571; B60H 1/3229; F16K 27/003
See application file for complete search history.

(56) References Cited

U.S. PATENT DOCUMENTS 9,080,679 B2 *   7/2015  Kuhbauch ............. F16K 27/003
9,850,920 B2 * 12/2017  Inada ................... F15B 13/0814
(Continued)

FOREIGN PATENT DOCUMENTS

CN    106711533 A    5/2017
CN    108068576 A    5/2018
(Continued)

OTHER PUBLICATIONS

Translation CN 21265592.*
(Continued)

*Primary Examiner* — Kevin F Murphy
(74) *Attorney, Agent, or Firm* — Yue (Robert) Xu; Apex Attorneys Law, LLP (57) ABSTRACT

A connecting device and an integrated assembly are provided. The connecting device comprises a reinforcing portion and a flow channel portion, wherein the reinforcing portion is in a fixed or limited arrangement with the flow channel portion. The connecting device is provided with a plurality of external interfaces which can be used for connecting to a system, and the flow channel portion comprises at least two modules and at least one interface portion; each module comprises a main body portion and a bottom plate, the main body portion is provided with recessed grooves on the side thereof close to the bottom plate, the main body
(Continued)

portion of the first module is fixed to the bottom plate by means of welding to form at least two communicating portions, and each communicating portion comprises a space where a corresponding groove is located.

20 Claims, 7 Drawing Sheets

(56) References Cited

U.S. PATENT DOCUMENTS

| | | | |
|---|---|---|---|
| 10,303,189 B2 * | 5/2019 | Mudd | G05D 7/0682 |
| 11,192,425 B2 * | 12/2021 | Oh | B60H 1/00007 |
| 2008/0000945 A1 | 1/2008 | Hidaka et al. | |
| 2016/0215664 A1 | 7/2016 | Boyer et al. | |
| 2019/0039440 A1 | 2/2019 | Calderone | |
| 2019/0390811 A1 * | 12/2019 | Shibata | F16L 41/03 |
| 2021/0053415 A1 | 2/2021 | Oh et al. | |

FOREIGN PATENT DOCUMENTS

| | | | |
|---|---|---|---|
| CN | 108955313 A | | 12/2018 |
| CN | 208907756 U | | 5/2019 |
| CN | 110411247 A | | 11/2019 |
| CN | 111446472 A | | 7/2020 |
| CN | 111619404 A | | 9/2020 |
| CN | 212178003 U | | 12/2020 |
| CN | 212765592 U | * | 3/2021 |
| CN | 112606676 A | | 4/2021 |
| WO | 2021048095 A1 | | 3/2021 |

OTHER PUBLICATIONS

International Search Report for PCT/CN2022/087031 mailed Jul. 4, 2022, ISA/CN.

European search report issued on Feb. 13, 2025 for EP22787625.7.

* cited by examiner

Fig. 9

CONNECTING DEVICE AND INTEGRATED ASSEMBLY

This disclosure is a national phase application of PCT international patent application PCT/CN2022/087031 filed on Apr. 15, 2022 which claims the priority to Chinese Patent Disclosure No. 202110409751.9, titled "CONNECTING DEVICE AND INTEGRATED ASSEMBLY", filed with the China National Intellectual Property Administration on Apr. 16, 2021, the entire disclosure of which are incorporated herein by reference.

FIELD

This disclosure relates to a thermal management system for a vehicle, in particular to a connecting device.

BACKGROUND

A thermal management system for a vehicle includes many components, for example the thermal management system generally includes a heat exchanging assembly such as an intermediate heat exchanger and a plate-type heat exchanger, a throttling element, a fluid assembly such as a vapor-liquid separator or a liquid reservoir, and a control valve, and other components. These components are connected by pipelines and fixed in the system. Because there are many components in the system, the pipeline connection of the system is also relatively complex.

SUMMARY

In order to provide a connecting device that is relatively simple and convenient to use when a system is connected, the disclosure provides the following technical solutions.

A connecting device includes a reinforcing portion and a flow passage portion, wherein the reinforcing portion is fixedly or limitedly arranged to the flow passage portion. The connecting device includes at least one external port portion, the connecting device is provided with multiple external ports that can be used for connecting to a system, and at least one external port portion is provided with more than two external ports. The flow passage portion includes at least two modules and at least one port portion, wherein the two modules includes a first module, and the flow passage portion includes a sensing element port portion and at least three valve connecting portions. The flow passage portion is provided with a heat exchanging port that can be connected to the heat exchanging portion. The first module includes a main body portion and a bottom plate, wherein the first module includes at least two valve connecting portions. The main body portion of the first module is provided with grooves on one side thereof close to the bottom plate, the main body portion of the first module is fixed to the bottom plate. The first module includes at least two communicating portions, and each communicating portion includes a space where a corresponding groove is located. The chambers of at least two valve connecting portions of the first module are in communication with at least one of the communicating portions of the first module, and at least two communicating portions of the first module are in communication with the chamber of the valve connecting portion of the first module. The first module is connected to and in communication with another module and/or port portion of the flow passage portion by a connecting portion.

Further, there is also provided an integrated assembly including a connecting device. The integrated assembly includes a sensing element, at least three valves, a fluid assembly, and at least one heat exchanging portion. The sensing element is fixedly or limitedly arranged to a sensing element port portion, and the valve is connected to each valve connecting portion, respectively. The fluid assembly is in a fixed or limited arrangement with a port portion corresponding to the flow passage portion. Alternatively, the fluid assembly is fitted with the port portion corresponding to the flow passage portion and is fixedly or limitedly arranged to the reinforcing portion. The heat exchanging portion is provided with four ports, and at least two of the four heat exchanging ports are respectively in communication with the corresponding heat exchanging ports of the connecting device. The heat exchanging portion is fixed to the flow passage portion by welding or the heat exchanging portion is fixed to the reinforcing portion by threaded connection or snap-fit, so that the heat exchanging portion is relatively fixed to the flow passage portion.

The external port portion herein refers to a component that is provided with a port connected to other components of a system, which may be a module or a port portion with an external port. The heat exchanging port portion refers to a component that is provided with a port connected to the heat exchanging portion, which may be a separate module or a port portion or a part of the module or port portion.

In the above-mentioned connecting device, the reinforcing portion is provided separately from the flow passage portion, so that the flow passage portion is formed by combining the required module and the port portion, and then the connecting device is relatively fixed by the reinforcing portion, so it facilitates of processing, and then the connecting device can be combined together in a combined form, so it is possible to correspondingly reduce the cost loss while facilitates of processing.

In FIG. 1 to FIG. 9:

| | |
|---|---|
| 10. reinforcing portion; | 101. plate-shaped portion; |
| 11. hole; | 20. flow passage portion; |
| 21. first port portion; | 22. second port portion; |
| 221, 222. interfaces; | 23. first module; |

-continued

| | |
|---|---|
| 230. main body portion of the first module; | 231. valve connecting portion, |
| 232. external port portion; | 2321. first external interface; |
| 2322. second external interface; | 2323. third external port, |
| 2324. fourth external interface; | 233. sensing element port portion; |
| 2350. bottom side; | 2351. first groove; |
| 2352. second groove; | 2353. third groove; |
| 2354. fourth groove; | 2355. fifth groove; |
| 2361. lateral interface; | 2362. lateral interface; |
| 239. bottom plate; | 24. second module; |
| 240. main body portion of the second module; | 241, 243. valve connecting portion; |
| 242. external port portion; | 2421. seventh external interface; |
| 2422. eighth external interface; | 249. bottom plate; |
| 25. third module; | 250. main body portion; |
| 251. valve connecting portion; | 252. sensing element connecting portion; |
| 2551. sixth groove; | 2552. seventh groove; |
| 2561. first lateral port portion; | 2562. second lateral port portion, |
| 2563. third lateral port portion; | 259. bottom plate; |
| 26. external port portion; | 261. sixth lateral interface; |
| 262. fifth external interface; | 31. first valve; |
| 32. second valve; | 33. third valve; |
| 34. fourth valve; | 35. fluid assembly, |
| 36. fifth valve; | 37. sixth valve; |
| 41. first heat exchanging portion; | 411. first heat exchanging interface; |
| 412. second heat exchanging interface; | 413. third heat exchanging port, |
| 414. fourth heat exchanging interface; | 42. second heat exchanging portion, |
| 421. fifth heat exchanging interface; | 422. sixth heat exchanging port, |
| 428, 429. interface; | 43. sensing element, |
| 51. first connecting portion; | 52. second connecting portion, |
| 53. third connecting portion; | 54. fourth connecting portion, |
| 55. fifth connecting portion; | 56. sixth connecting portion; |
| 61. snap portion; | 62, 63. threaded connecting portion. |

DETAILED DESCRIPTION OF THE EMBODIMENTS

The technical solutions will be described below in combination with specific embodiments. An integrated assembly includes a connecting device, the connecting device includes a reinforcing portion and a flow passage portion. The flow passage portion is provided with a component having a port, and the flow passage portion includes at least three modules or port portions. Each module or port portion has more than two ports respectively, and the modules or port portions are in communication with each other by the connecting portions, respectively. The reinforcing portion is used to receive the flow passage portion and facilitate the connection and installation with the system. For example, the flow passage portion may be relatively fixed or limited by fixing or position-limiting, and the reinforcing portion may be fixed to the system. The flow passage portion has multiple ports connected to the system, and the flow passage portion is relatively fixed or limited by the reinforcing portion, so that the flow passage portion can reduce the influence of vibration and the like in the system. The integrated assembly includes a connecting device and components that can be fixed or limited to the connecting device, such as a fluid control valve, a fluid assembly such as a vapor-liquid separator or a liquid reservoir, a heat exchanging portion etc. The valve can be a control valve, a one-way valve, a throttle valve, etc. The flow passage portion can include multiple modules and/or port portions, each module or/and port portion has at least two ports, and the port portions can be connected to the components, and a chamber of the port portion can be in communication with the corresponding component. For example, one module may be connected to one or more components, and it is also possible that parts of two modules are respectively connected to one component.

Figure 1:
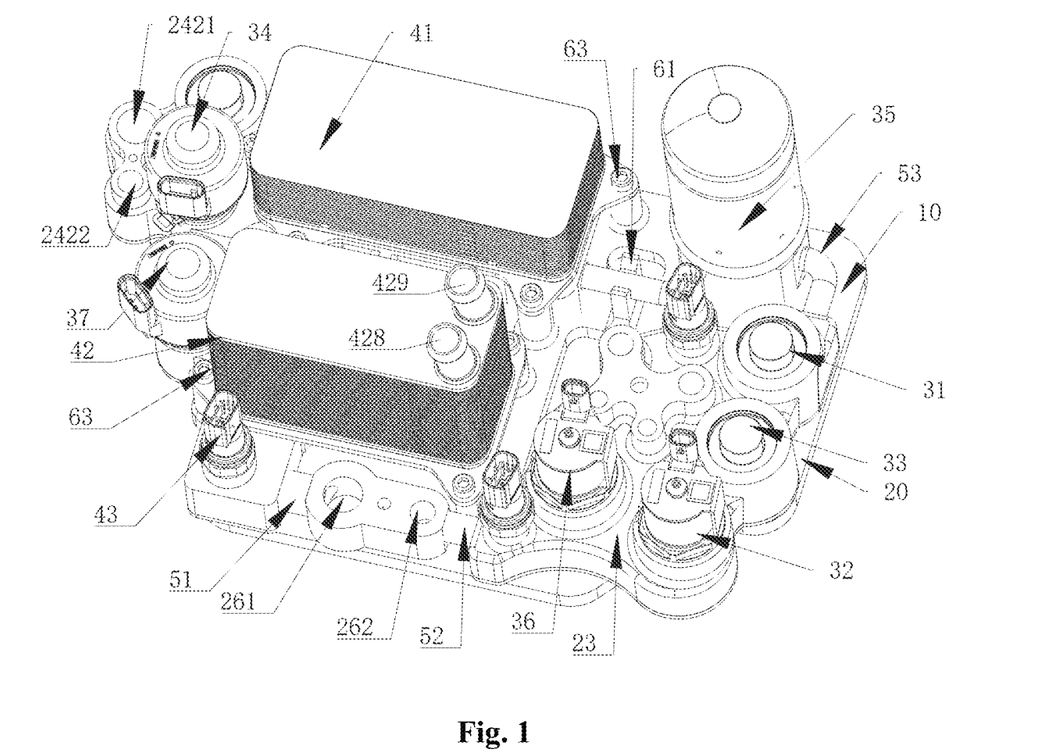
FIG. 1 is a schematic perspective view of an embodiment of an integrated assembly.
Figure 2:
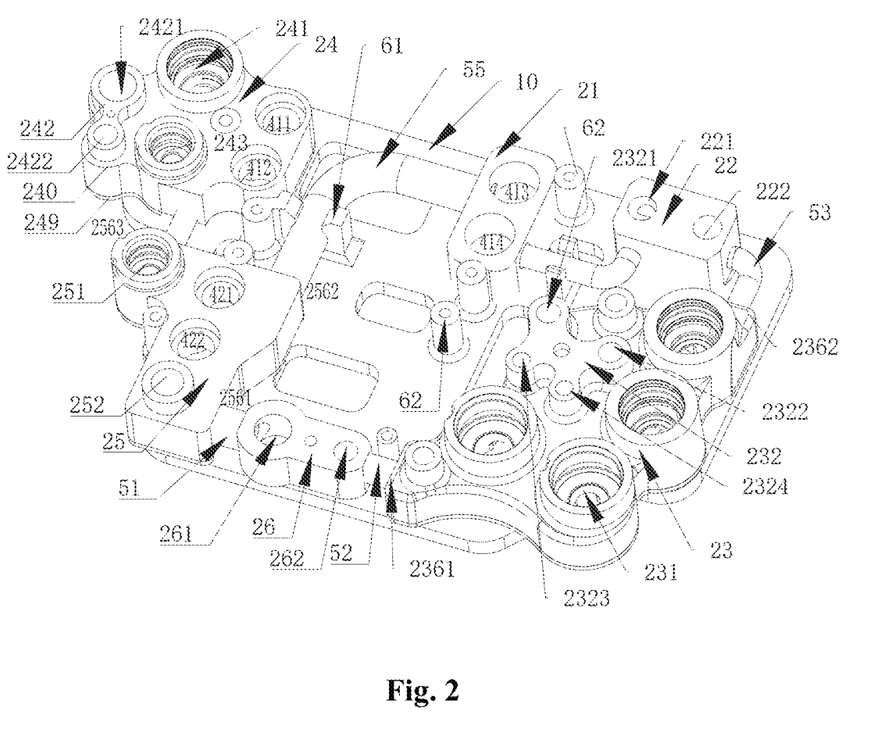
FIG. 2 is a schematic perspective view of a connecting device portion of the integrated assembly shown in FIG. 1.
Figure 3:
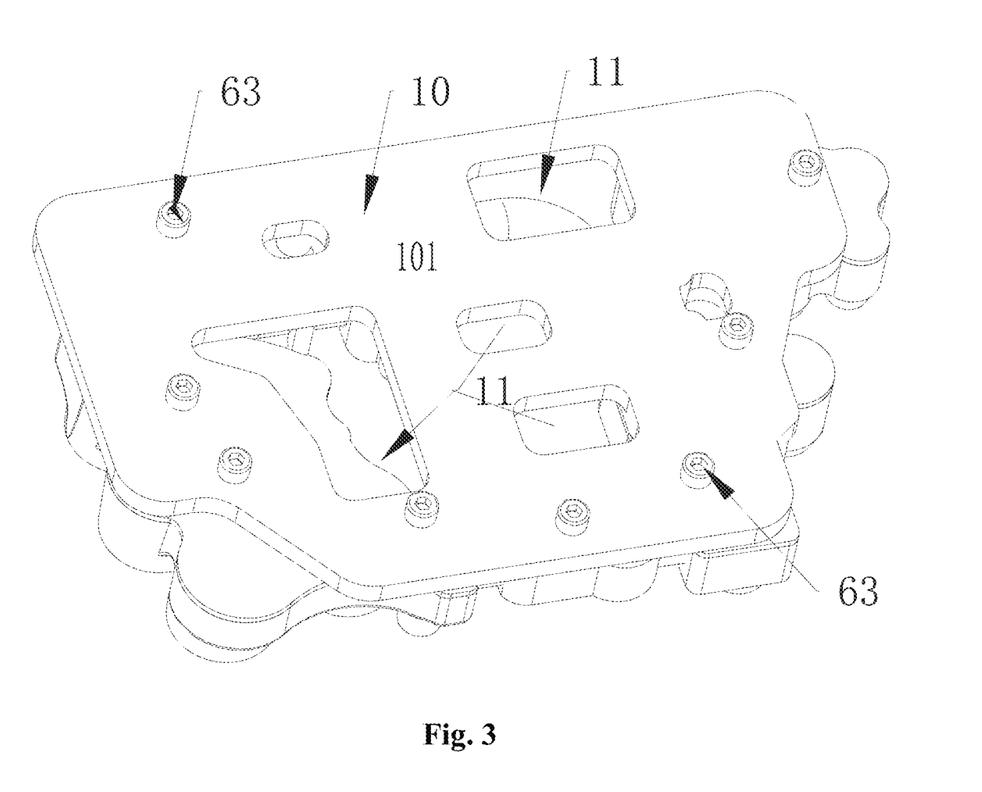
FIG. 3 is a schematic perspective view of the connecting device shown in FIG. 2 from back side.
Figure 4:
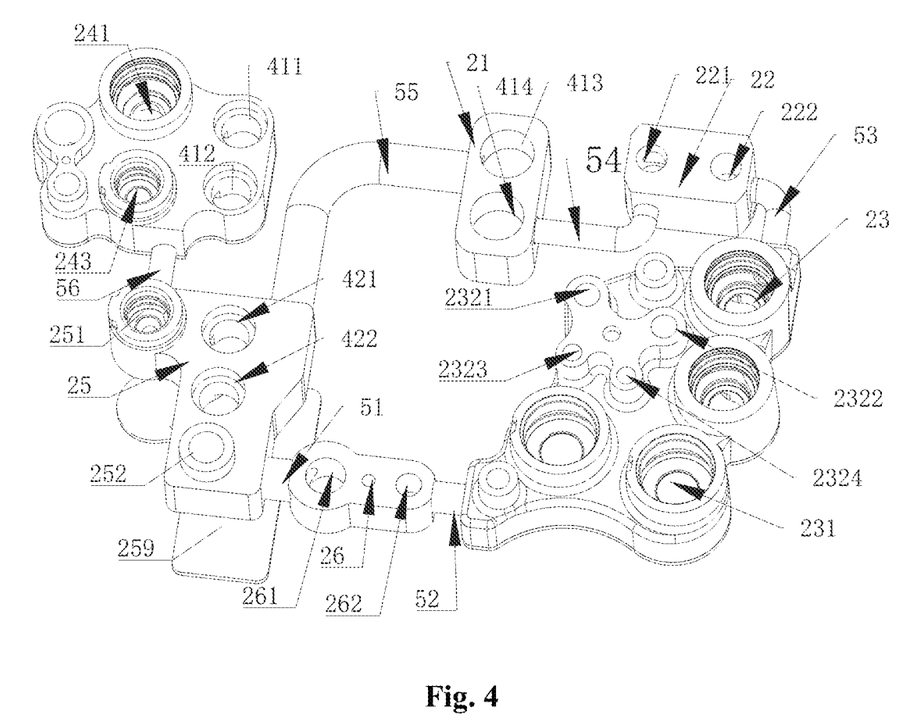
FIG. 4 is a schematic perspective view of a flow passage portion of the connecting device shown in FIG. 2 and FIG. 3.
Figure 5:
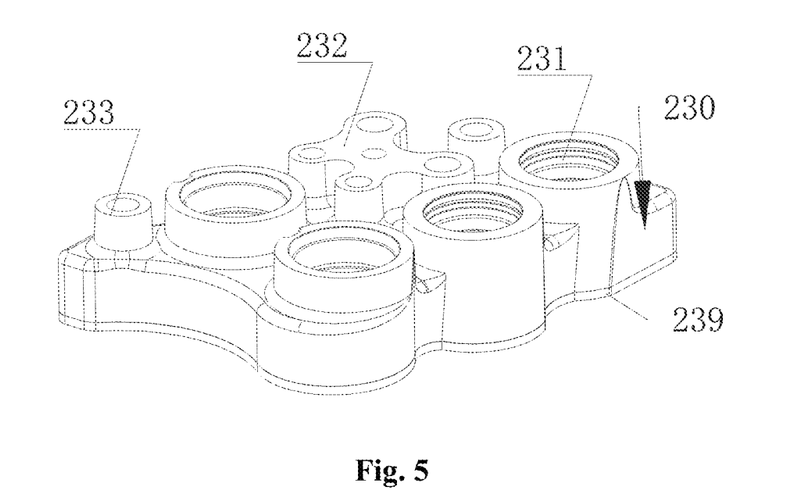
FIG. 5 is a schematic perspective view of a first module of the above connecting device.
Figure 6:
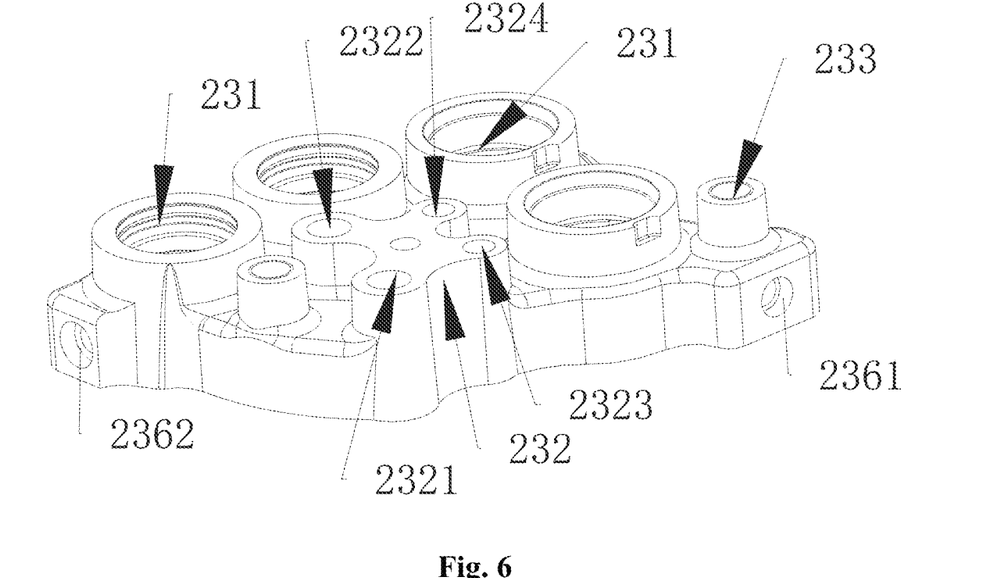
FIG. 6 is a schematic perspective view of a main body portion of the first module shown in FIG. 5.
Figure 7:
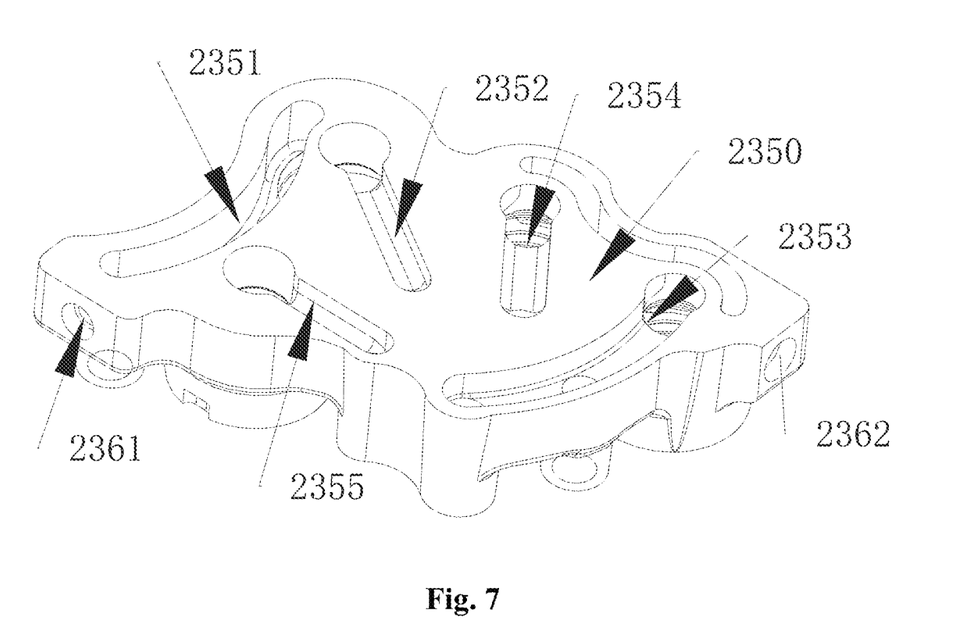
FIG. 7 is a schematic view of the main body portion of the first module shown in FIG. 6 in another direction.
Figure 8:
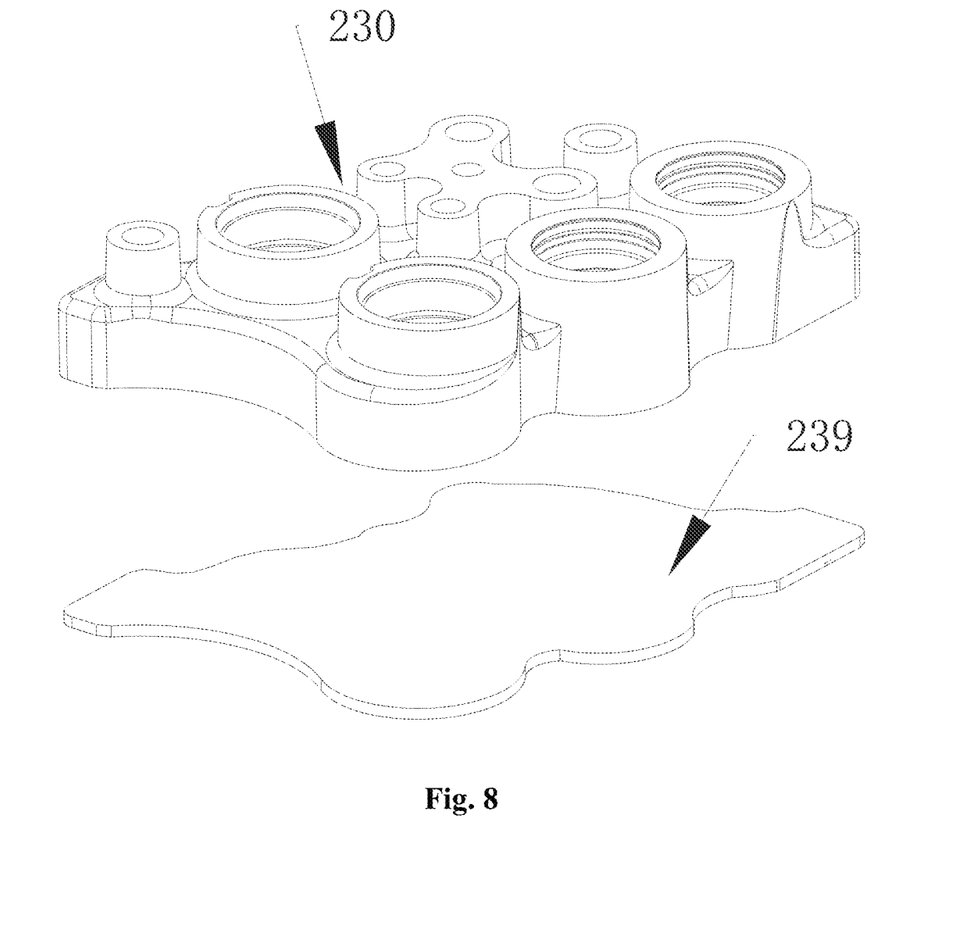
FIG. 8 is an exploded schematic view of the first module shown in FIG. 5.
Figure 9:
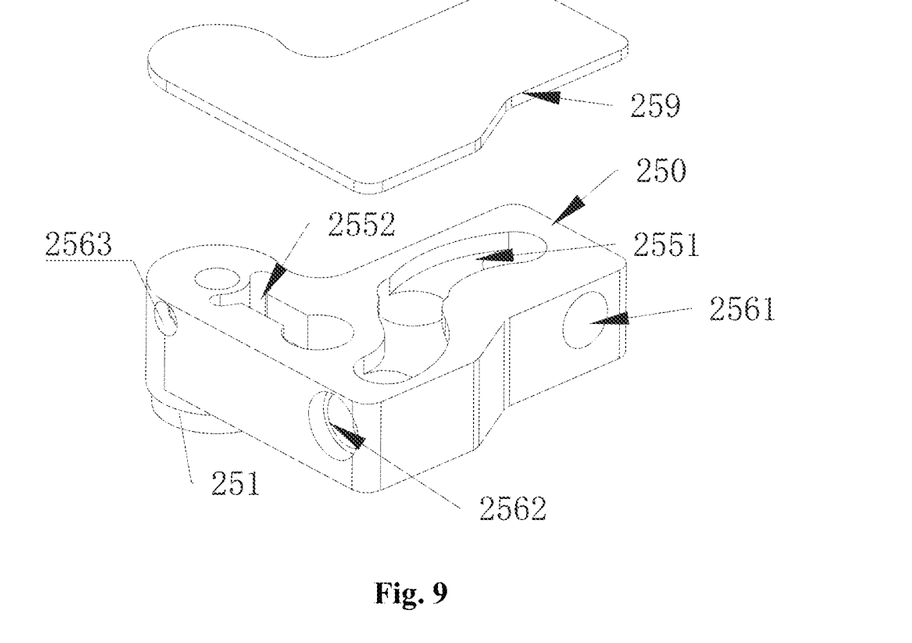
FIG. 9 is an exploded schematic perspective view of a second module of the connecting device.

Herein, a specific embodiment is illustrated, with reference to FIG. 1-FIG. 9, FIG. 1 is a perspective schematic view of an embodiment of an integrated assembly, FIG. 2 is a perspective schematic view of a portion including a flow passage portion and a reinforcing portion in a connecting device of the integrated assembly, FIG. 3 is a perspective schematic view of the connecting device shown in FIG. 2 in another direction, FIG. 4 is a perspective schematic view of the flow passage portion of the connecting device shown in FIG. 2 and FIG. 3, and FIG. 5 is a perspective schematic view of a first module. FIG. 6 is a perspective schematic view of a main body portion of the first module shown in FIG. 5, FIG. 7 is a perspective schematic view of the main body of the first module shown in FIG. 6 from back side, FIG. 8 is an exploded schematic view of the first module shown in FIG. 5, and FIG. 9 is a perspective exploded schematic view of a second module of the above-described assembly.

An integrated assembly includes a reinforcing portion 10, a flow passage portion 20, multiple control valves, a fluid assembly 35, and a heat exchanging assembly. The reinforcing portion 10 and the flow passage portion 20 are fixedly arranged. The heat exchanging assembly includes a first heat exchanging portion 41 and a second heat exchanging portion 42. The control valves specifically include a first valve 31, a second valve 32, a third valve 33, a fourth valve 34, a fifth valve 36 and a sixth valve 37. The flow passage portion 20 specifically includes a first module 23, a second module 24 and a third module 25. The flow passage portion 20 may further include an external port portion 26, a first port portion 21 and a second port portion 22. The integrated assembly may also include a sensing element 43. Each of modules and each of port portions are connected to and correspondingly in communication with each other through a connecting device. The connecting device has at least two external port portions that are cooperatively connected to other components of the system, such as the first external port portion 26 of this embodiment, an external port portion 232 of the first module and an external port portion 242 of the second module, and each external port portion has at least one external port. In this way, the connecting device has multiple external ports that are used for connection to the system, and some of the external port portions may be provided with more than two external ports. For example, the external port portion 232 of the first module is provided with a first external port 2321, a second external port 2322, a third external port 2323 and a fourth external port 2324. The external port portion 26 is provided with a fifth external port 262 and a sixth external port 261. The external port portion 242 of the second module is provided with a seventh external port 2421, an eighth external port 2422. The flow passage portion 20 also includes a sensing element port portion, at least three valve connecting portions, and at least one heat exchanging port portion that can be connected to the heat exchanging portion.

Herein, the first module is first described as an example. The first module 23 includes a main body portion 230 and a bottom plate 239. The first module has four valve connecting portions 231, two sensing element port portions 233 and an external port portion 232. The first module includes several communicating portions. The main body portion 230 of the first module is provided with recessed grooves on the side thereof close to the bottom plate 239, the recessed grooves specifically include a first groove 2351, a second groove 2352, a third groove 2353, a fourth groove 2354 and a fifth groove 2355. The main body portion 230 of the first module is fixed to the bottom plate 239 by means of welding. Specifically, a bottom side portion 2350 of the main body portion of the first module is cooperatively welded to the bottom plate, and thus the spaces where the first groove 2351, the second groove 2352, the third groove 2353, the fourth groove 2354 and the fifth groove 2355 are located can become corresponding communicating portions or a part of the communicating portions, respectively. The communicating portion herein refers to a passage between two ports, such as a passage that enables a communication among a chamber of a valve, a heat exchanging port, and a port or a chamber of other component. Each communicating portion includes the space where each corresponding groove is located. And at least two communicating portions of the first module are in communication with a chamber of the valve connecting portion of the first module. In this embodiment, the chamber of the valve connecting portion of the first module is each in communication with at least one of the communicating portions of the first module, and the communicating portions of the first module are each in communication with the chamber of one of the valve connecting portions of the first module, and even some of the communicating portions are in communication with the chambers of two valve connecting portions. The chamber of certain valve connecting portion is in communication with two communicating portions. Each of the four valve connecting portions can be mounted with one control valve, respectively, and the chamber of each valve connecting portion may be in communication with one or two or three of the communicating portions as required. Each communicating portion is at least in communication with at least one of the valve, the external port and the sensing element. Each communicating portion is in communication with at least two spaces. The other two port portions are connected to and in communication with the first module through the connecting portion. The external port portion 26 is provided with two lateral port portions. One of the lateral port portions of the external port portion 26 is connected to one lateral port portion 2361 of the first module through the second connecting portion 52, and the other lateral port portion 2362 of the first module is connected to one lateral port portion of the second port portion 22 through a third connecting portion 53.

The integrated assembly has a fluid assembly and at least one heat exchanging portion, and the heat exchanging portion is connected to the flow passage portion through the heat exchanging port portion. The heat exchanging portion is fixed to the flow passage portion by means of welding. Alternatively, the heat exchanging portion is fixed to the reinforcing portion by means of threaded connection or snap-fit, so that the heat exchanging portion is relatively fixed to the flow passage portion. The flow passage portion includes a port fit with the fluid assembly, and the fluid assembly is fixed to the flow passage portion by welding, or the fluid assembly is fixed to the reinforcing portion and/or the flow passage portion by threaded connection or snap-fit. In this embodiment, the fluid assembly 35 may specifically be one of a liquid reservoir, a vapor-liquid separator, a liquid-storage separator, etc. The fluid assembly 35 is fixed to or limitedly arranged with the second port portion 22. One port of the fluid assembly 35 is in communication with the first module through the lateral port portion of the second port portion 22 and the third connecting portion 53. And the other port of the fluid assembly is in communication with the first port portion 21 through the other lateral port portion of the second port portion 22 and the fourth connecting portion 54.

In this embodiment, the reinforcing portion 10 is fixed to the flow passage portion 20 by means of threaded connection and snap-fit. Specifically, the reinforcing portion is provided with a threaded connecting portion 62 and a snap portion 61. The snap portion, the threaded connecting portion and the plate-shaped part may be an integral structure or a fixed structure. For example, the reinforcing portion may be a plastic part that is formed by injection molding, and the snap portion and the threaded connecting portion may be integrated with the plate-shaped portion and are both formed by injection molding. The reinforcing portion may also be made of other materials. For example, the main body portion of the reinforcing portion is made of a metal material, such as an aluminum alloy material. The snap portion and the threaded connecting portion may be fixed to the main body portion of the reinforcing portion by welding or relatively fixed to the main body portion of the reinforcing portion by snap-fit.

The flow passage portion also includes a second module 24, the second module 24 includes a main body portion 240 and a bottom plate 249. The second module includes valve connecting portions 241 and 243, a heat exchanging port portion provided with heat exchanging ports 411 and 412, and an external port portion 242 that has a seventh external port 2421 and an eighth external port 2422. The second module further includes at least one lateral port portion. The second module is connected to the third module through the lateral port portion and a connector. In a specific embodiment, the refrigerant passes through the liquid reservoir, via a heat exchanging port 414 of the first port portion 21, and through the first flow passage of the first heat exchanging portion to the second module. The refrigerant is divided into two parts, one part flows to an evaporator of the system through the eighth external port 2422 after being throttled by a throttling element, and the refrigerant from the evaporator flows to the heat exchanging port 411 of the second module through the seventh external port 2421 and the other communicating portion of the second module, and then flows to the second flow passage of the first heat exchanging portion through the heat exchanging port, and exchanges heat with the medium of the other flow passage in the first heat exchanging portion, and then flows to the third module through a heat exchanging port 413 of the first port portion. The other part of the refrigerant may flow to the third module through the connector connected to the lateral port. The main body portion 240 of the second module is also provided with recessed grooves on the side thereof close to the bottom plate 249 to form corresponding communicating portions. In addition, the flow passage portion may also be provided with a threaded connecting portion 62, and the reinforcing portion 10 may be connected to the flow passage portion 20 by screws 63. Meanwhile, the snap portion 61 may be used to limit the connecting portion that is relatively weak in strength, and then the connecting portion is fixed to the corresponding module and/or port portion by welding connection to meet the requirement to the corresponding mechanical properties.

The flow passage portion also includes a third module 25, the third module 25 includes a valve connecting portion 251, a sensing element connecting portion 252, the heat exchanging port portion with heat exchanging ports 421 and 422, and the third module also includes two lateral port portions. The third module 25 includes a main body portion 250 of the third module and a bottom plate 259, and the third module includes several communicating portions. The main body portion 250 of the third module is provided with recessed grooves on the side thereof close to the bottom plate 259, specifically including a sixth groove 2551 and a seventh groove 2552. The main body portion 250 of the third module is fixed to the bottom plate 259 by welding. With the cooperation between main body portion of the third module and the bottom plate, the spaces where the sixth groove 2551 and the seventh groove 2552 are located can be formed as corresponding communicating portions or a part of the communicating portions, respectively. The refrigerant from the second module can pass through the valve 37, such as a throttle valve, through the lateral port portion 2563, and the refrigerant from the second module may be throttled once or not throttled. After being throttled by the throttle valve, the refrigerant flows to the heat exchanger port 421 through the communicating portion where the seventh groove 2552 is located, and then exchanges heat with the medium of another flow passage in the second heat exchanging portion, returns to the heat exchanger port 422, and then flows to the external port portion 26 through the communicating portion where the sixth groove 2551 is located and the lateral port portion 2561. This communicating portion is also in communication with the chamber where the sensing element port portion is located, and the sensing element may extend into the communicating portion to obtain the corresponding parameters of the refrigerant flowing through it, such as temperature and/or pressure. In this embodiment, the third module is provided with three lateral port portions: a first lateral port portion 2561, a second lateral port portion 2562 and a third lateral port portion 2563. The first lateral port portion 2561 is connected to and in communication with the external port portion 26 through the first connecting portion 51. The second lateral port portion 2562 is connected to and in communication with the first port portion 21 through the fifth connecting portion 55. The third lateral port portion 2563 is connected to and in communication with the second module 24 through the sixth connecting portion 56. The first port portion 21 is connected to the second lateral port portion 2562 through the fifth connector 55. The refrigerant from the first port portion 21 flows through the second lateral port portion 2562 and the communicating portion where the sixth groove 2551 is located, and then merges with the refrigerant that is heat exchanged with the second heat exchanging portion, and flows to the external port portion 26 through the first lateral port portion 2561, and then flows back to a compressor.

In addition, a threaded connecting portion 62 may also be provided in the flow passage portion, and the reinforcing portion 10 is connected to the flow passage portion 20 by screws 63. In addition, the snap portion 61 is used to limit the connecting portion that is relatively weak in strength, and then the connecting portion is connected and fixed to the corresponding module and/or port portion by welding so as to meet the requirement to the corresponding mechanical properties.

The connecting device has multiple valve connecting portions, an opening of the valve connecting portion is arranged away from the reinforcing portion, and the port of the external port portion is also arranged face away from the reinforcing portion, which is convenient for detection. A main body of the reinforcing portion includes a plate-shaped portion, and the plate-shaped portion of the reinforcing portion is relatively close to or at least partially attached to the bottom side of the flow passage portion. The flow passage portion has multiple lateral port portions, for example the first module is provided with two lateral port portions, the second module is provided with one lateral port portion, and the third module is provided with three lateral port portions. The first port portion is provided with two lateral port portions, the second port portion is provided with two lateral port portions, and the external port portion is provided with two lateral port portions. The external port portion is associated with the system and may be provided as desired. The lateral port portion herein is defined relative to an upper side and a lower side, and the lateral port portion may be provided around all sides. The corresponding two of individual modules and port portions are connected to and in communication with each other through a connecting portion, the connecting portion may be a connecting pipe. The first module is connected to and in communication with the other modules and/or two of the port portions through the connecting pipe, respectively. The connecting pipes connected to the first module are connected to one of the lateral port portions, respectively; and the connecting pipe is fixed to the lateral port portion by welding. Specifically, the flow passage portion includes a first port portion 21, a second port portion 22, and an external port portion 26. The first module 23 is connected to the second port portion 22 through a connecting pipe, the first module 23 is connected to the external port portion 26 through a connecting pipe, and the second port portion 22 is connected to the first port portion 21 through a connecting pipe. The third module 25 is connected to the external port portion 26 through a connecting pipe, and the third module 25 is connected to the first port portion 21 through a connecting pipe, and the third module 25 is connected to the second module 24 through a connecting pipe.

The first port portion 21 includes two heat exchanging ports 413 and 414 and two lateral port portions, and the heat exchanging ports 413 and 414 are arranged away from the reinforcing portion. The second port portion 22 includes ports 221 and 222 for connecting to the fluid assembly, and two lateral port portions. The first module 23 includes two sensing element port portions 233, four valve connecting portions 231 and an external port portion 232.

The main body of the reinforcing portion 10 includes a plate-shaped portion 101, and the reinforcing portion has a hole 11 in the plate-shaped portion, so that on the one hand, the weight of the connecting device may be reduced, and on the other hand, fixing member or the like can pass through the reinforcing portion to assist in fixing or limiting the flow passage portion.

The integrated assembly includes at least one sensing element, at least three control valves, a fluid assembly, and at least one heat exchanging portion. The sensing element is fixed or limited to a sensing element port portion, the valves are fixedly or limitedly arranged to their respective valve connecting portions, and the fluid assembly is fixedly or limitedly arranged to the port portion corresponding to the flow passage portion. Specifically, the integrated assembly in this embodiment includes three sensing elements, seven control valves, a fluid assembly and two heat exchanging portions. The control valves may have multiple valves for different purposes, of which four control valves are fixedly or limitedly arranged to the first module, and three control valves are fixedly or limitedly arranged to the second module. The fluid assembly is fixedly or limitedly arranged to the second port portion. The two heat exchanging portions include a first heat exchanging portion 41 and a second heat exchanging portion 42, both the first heat exchanging portion 41 and the second heat exchanging portion 42 can be a double-flow passages heat exchanger. Specifically, the first heat exchanging portion 41 may be used for heat exchange between a relatively high-temperature refrigerant and a relatively low-temperature refrigerant, and both the two flow passages inside the first heat exchanging portion may be used for flowing and heat exchanging of the refrigerant. The second heat exchanging portion 42 may be used for heat exchange between the refrigerant and a heat transfer medium, and one of the two flow passages inside the second heat exchanging portion may be used for flowing of the refrigerant, and the other may be used for flowing and heat exchanging of the heat transfer medium.

The flow passage portion 20 has a first heat exchanging port 411, a second heat exchanging port 412, a third heat exchanging port 413, a fourth heat exchanging port 414, a fifth heat exchanging port 421 and a sixth heat exchanging port 422. The second module includes the first heat exchanging port 411 and the second heat exchanging port 412. The first port portion 21 includes the third heat exchanging port 413 and the fourth heat exchanging port 414. The first heat exchanging portion 41 has four ports, two of which are respectively in communication with the first heat exchanging port 411 and the second heat exchanging port 412 of the second module 24, the other two ports are respectively in communication with the third heat exchanging port 413 and the fourth heat exchanging port 414 of the first port portion 21. The first heat exchanging port 411 is in communication with the third heat exchanging port 413 through a first flow passage of the first heat exchanging portion. The second heat exchanging port 412 is in communication with the fourth heat exchanging port 414 through a second flow passage of the first heat exchanging portion. In different systems, the connection methods may be different. For example, in different systems, the first heat exchanging port 411 may be in communication with the second heat exchanging port 412 through the first flow passage of the first heat exchanging portion, the third heat exchanging port 413 may be in communication with the fourth heat exchanging port 414 through the second flow passage of the first heat exchanging portion. Accordingly, the structure of the second module and the communication method of the communicating portion are different accordingly. The first heat exchanging portion may be fixedly connected to the reinforcing portion by screws while the first heat exchanging portion can be fixed to the flow passage portion.

The third module 25 includes the fifth heat exchanging port 421 and the sixth heat exchanging port 422. The second heat exchanging portion 42 includes two flow passages, and the second heat exchanging portion 42 has four ports, two ports of which are in communication with the fifth heat exchanging port 421 and the sixth heat exchanging port 422 of the third module 25, respectively, the fifth heat exchanging port 421 is in communication with the sixth heat exchanging port 422 through a first flow passage of the second heat exchanging portion 42. The other two ports 428 and 429 are used to flow the heat transfer medium therethrough, and the port 428 is in communication with the port 429 through a second flow passage of the second heat exchanging portion, and the two flow passages can carry out heat-exchanging to realize the heat exchanging between the cooling medium and the refrigerant. The fifth heat exchanging port 421 and the sixth heat exchanging port 422 may also be provided on one side close to the reinforcing portion. In practical use, the fifth heat exchanging port 421 and the sixth heat exchanging port 422 are in communication with a heat transfer medium of the system. The second heat exchanging portion can be fixedly connected to the reinforcing portion by means of screws, while the second heat exchanging portion can be fixed to the flow passage portion.

In a specific thermal management system, the thermal management system further includes a compressor, an external heat exchanger, a radiating heat exchanger and an evaporator in addition to an integrated assembly. The integrated assembly has eight external ports, specifically including: a seventh external port 2421 and an eighth external port 2422 provided on the second module; a fifth external port 262 and a sixth external port 261 provided in the external port portion 26; a first external port 2321, a second external port 2322, a third external port 2323 and a fourth external port 2324 provided on the first module. The seventh external port 2421 provided on the second module is in communication with one port of the evaporator, and the eighth external port 2422 is in communication with another port of the evaporator. The fifth external port 262 provided in the external port portion 26 is in communication with an outlet of the compressor, and the sixth external port 261 is in communication with an inlet of the compressor. The first external port 2321 provided in the first module is in communication with an outlet of the external heat exchanger, and the second external port 2322 is in communication with an outlet of the radiating heat exchanger, the third external port 2323 is in communication with an inlet of the external heat exchanger, and the fourth external port 2324 is in communication with an inlet of the radiating heat exchanger. With the provision of integrated assembly, the connection and installation of the thermal management system are relatively simple and convenient.

In the above-mentioned connecting device, the reinforcing portion is provided separately from the flow passage portion, so that the flow passage portion is formed by combining the required module and the port portion, and then the connecting device is relatively fixed by the reinforcing portion, so it facilitates of processing, and then they are assembled together in a combination form. Each module can be tested independently, or the flow passage portion can be tested before the final assembly. In this regard, it facilitates of processing and can correspondingly reduce the cost loss caused by defective products. In addition, in the above embodiment, the flow passage portion includes three modules and three port portions, which is not necessary. The modules and port portions may be configured according to the requirement of easy manufacturing. For example, there can be only two modules, and the first port portion and the second port portion may also be combined into one port portion.

It should be noted that the above-mentioned embodiments are only used to illustrate the present disclosure, not to limit the technical solutions described in the present disclosure, which cannot be taken as a limitation on the protection scope of the technical solutions of the present disclosure. Although the present specification has described the present disclosure in detail with reference to the above-mentioned embodiments, it should be understood by those skilled in the art that a person skilled in the art to which it belongs may still make modifications, combinations or equivalent substitutions of the present disclosure. And all technical solutions and improvements that do not depart from the spirit and scope of the present disclosure should be included in the scope of claims of the present embodiment.

The invention claimed is:

1. A connecting device, comprising a reinforcing portion and a flow passage portion, wherein the reinforcing portion is fixedly or limitedly arranged to the flow passage portion; the connecting device comprises at least one external port portion, and the connecting device is provided with a plurality of external ports that are able to be connected to a system, and the at least one external port portion is provided with more than two external interfaces; the flow passage portion comprises at least two modules and at least one port portion, the two modules comprise a first module; the flow passage portion comprises a sensing element port portion and at least three valve connecting portions, wherein the flow passage portion is provided with a heat exchanging port that is able to be connected to a heat exchanging portion; the first module comprises a main body portion and a bottom plate, the first module comprises at least two valve connecting portions, the main body portion of the first module is provided with grooves on one side thereof close to the bottom plate, the main body portion of the first module is fixed to the bottom plate, the first module comprises at least two communicating portions, and the communicating portion comprises a space where a corresponding groove is located; chambers of at least two valve connecting portions of the first module are in communication with at least one of the communicating portions of the first module, and at least two communicating portions of the first module are in communication with an chamber of the valve connecting portion of the first module, the first module is connected to and in communication with another module and/or port portion of the flow passage portion by a connecting portion.

2. The connecting device according to claim 1, wherein the reinforcing portion is fixed to the flow passage portion by threaded connection and/or snap-fit; the module of the flow passage portion is fixed to the port portion by welding, and the main body portion of the first module is fixed to the bottom plate by welding; the flow passage portion comprises a port for fitting with a fluid assembly, and the fluid assembly is able to be fixed to the flow passage portion by welding or the fluid assembly is able to be fixed to the reinforcing portion and/or the flow passage portion by threaded connection or snap-fit.

3. The connecting device according to claim 2, wherein an opening of the valve connecting portion is arranged away from the reinforcing portion, the port of the external port portion is also arranged away from the reinforcing portion, the first module is provided with two lateral port portions, and the connecting portion is a connecting pipe, and the first module is connected to and in communication with other modules and/or two of the port portions, respectively, through the connecting pipe, and the connecting pipes connected to the first module are connected to one of the lateral port portions, respectively, and the connecting pipe is fixed to the lateral port portion by welding; the chamber of the valve connecting portion of the first module is each in communication with at least one of the communicating portions of the first module, and the communicating portion of the first module is each in communication with the chamber of one of the valve connecting portions of the first module.

4. The connecting device according to claim 3, wherein the flow passage portion comprises a port portion, and the first module is connected to the port portion through a connecting pipe, and the port portion comprises two lateral port portions and a port for connecting to the fluid assembly, wherein one of the lateral port portions is welded to the lateral port portion of the first module through a connecting pipe; the first module comprises a sensing element port portion, at least three valve connecting portions and an external port portion.

5. The connecting device according to claim 4, wherein the port portion comprises a first port portion and a second port portion, the first module is connected to one of the first port portion and the second port portion through a connecting pipe, one of the first port portion and the second port portion comprises two heat exchanging ports and two lateral port portions, and the other one of the first port portion and the second port portion comprises two lateral port portions and a port for connecting to the fluid assembly, and the first port portion is connected to the second port portion through a connecting pipe.

6. The connecting device according to claim 5, wherein the reinforcing portion comprises a plate-shaped portion, the reinforcing portion has a hole in the plate-shaped portion, and the reinforcing portion comprises a snap portion and a threaded connecting portion, the snap portion, the threaded connecting portion and the plate-shaped portion are in an integrated structure or a fixed structure; the flow passage portion further comprises a second module, and the second module comprises a valve connecting portion and a heat exchanging port portion with a heat exchanging port.

7. The connecting device according to claim 4, wherein the reinforcing portion comprises a plate-shaped portion, the reinforcing portion has a hole in the plate-shaped portion, and the reinforcing portion comprises a snap portion and a threaded connecting portion, the snap portion, the threaded connecting portion and the plate-shaped portion are in an integrated structure or a fixed structure; the flow passage portion further comprises a second module, and the second module comprises a valve connecting portion and a heat exchanging port portion with a heat exchanging port.

8. The connecting device according to claim 3, wherein the reinforcing portion comprises a plate-shaped portion, the reinforcing portion has a hole in the plate-shaped portion, and the reinforcing portion comprises a snap portion and a threaded connecting portion, the snap portion, the threaded connecting portion and the plate-shaped portion are in an integrated structure or a fixed structure; the flow passage portion further comprises a second module, and the second module comprises a valve connecting portion and a heat exchanging port portion with a heat exchanging port.

9. The connecting device according to claim 2, wherein the reinforcing portion comprises a plate-shaped portion, the reinforcing portion has a hole in the plate-shaped portion, and the reinforcing portion comprises a snap portion and a threaded connecting portion, the snap portion, the threaded connecting portion and the plate-shaped portion are in an integrated structure or a fixed structure; the flow passage portion further comprises a second module, and the second module comprises a valve connecting portion and a heat exchanging port portion with a heat exchanging port.

10. The connecting device according to claim 1, wherein an opening of the valve connecting portion is arranged away from the reinforcing portion, the port of the external port portion is also arranged away from the reinforcing portion, the first module is provided with two lateral port portions, and the connecting portion is a connecting pipe, and the first module is connected to and in communication with other modules and/or two of the port portions, respectively, through the connecting pipe, and the connecting pipes connected to the first module are connected to one of the lateral port portions, respectively, and the connecting pipe is fixed to the lateral port portion by welding; the chamber of the valve connecting portion of the first module is each in communication with at least one of the communicating portions of the first module, and the communicating portion of the first module is each in communication with the chamber of one of the valve connecting portions of the first module.

11. The connecting device according to claim 10, wherein the reinforcing portion comprises a plate-shaped portion, the reinforcing portion has a hole in the plate-shaped portion, and the reinforcing portion comprises a snap portion and a threaded connecting portion, the snap portion, the threaded connecting portion and the plate-shaped portion are in an integrated structure or a fixed structure; the flow passage portion further comprises a second module, and the second module comprises a valve connecting portion and a heat exchanging port portion with a heat exchanging port.

12. The connecting device according to claim 1, wherein the reinforcing portion comprises a plate-shaped portion, the reinforcing portion has a hole in the plate-shaped portion, and the reinforcing portion comprises a snap portion and a threaded connecting portion, the snap portion, the threaded connecting portion and the plate-shaped portion are in an integrated structure or a fixed structure; the flow passage portion further comprises a second module, and the second module comprises a valve connecting portion and a heat exchanging port portion with a heat exchanging port.

13. The connecting device according to claim 12, wherein the connecting portion comprises more than five valve connecting portions and at least two sensing element connecting portions, the connecting device comprises at least six external ports, and the second module further comprises at least one lateral port portion; the port portion is fixed to the module by welding.

14. An integrated assembly, comprising a connecting device according to claim 1, wherein the integrated assembly comprises a sensing element, at least three valves, a fluid assembly and at least one heat exchanging portion, wherein the sensing element is fixedly or limitedly arranged to a sensing element port portion, and the valve is connected to each valve connecting portion, respectively; the fluid assembly is fixedly or limitedly arranged with a port portion corresponding to the flow passage portion, or the fluid assembly is fitted with the port portion corresponding to the flow passage portion and is fixed or limited to the reinforcing portion; the heat exchanging portion is provided with four ports, and at least two of the four heat exchanging ports are respectively in communication with the corresponding heat exchanging ports of the connecting device; the heat exchanging portion is fixed to the flow passage portion by welding or the heat exchanging portion is fixed to the reinforcing portion by threaded connection or snap-fit, so that the heat exchanging portion is relatively fixed to the flow passage portion.

15. The integrated assembly according to claim 14, wherein at least three of the external ports of the integrated assembly are arranged away from the reinforcing portion, and the reinforcing portion comprises a plate-shaped portion, and the plate-shaped portion of the reinforcing portion is relatively close to or at least partially attached to the bottom of the flow passage portion.

16. The integrated assembly according to claim 14, wherein the reinforcing portion is fixed to the flow passage portion by threaded connection and/or snap-fit; the module of the flow passage portion is fixed to the port portion by welding, and the main body portion of the first module is fixed to the bottom plate by welding; the flow passage portion comprises a port for fitting with a fluid assembly, and the fluid assembly is able to be fixed to the flow passage portion by welding or the fluid assembly is able to be fixed to the reinforcing portion and/or the flow passage portion by threaded connection or snap-fit.

17. The integrated assembly according to claim 16, wherein an opening of the valve connecting portion is arranged away from the reinforcing portion, the port of the external port portion is also arranged away from the reinforcing portion, the first module is provided with two lateral port portions, and the connecting portion is a connecting pipe, and the first module is connected to and in communication with other modules and/or two of the port portions, respectively, through the connecting pipe, and the connecting pipes connected to the first module are connected to one of the lateral port portions, respectively, and the connecting pipe is fixed to the lateral port portion by welding; the chamber of the valve connecting portion of the first module is each in communication with at least one of the communicating portions of the first module, and the communicating portion of the first module is each in communication with the chamber of one of the valve connecting portions of the first module.

18. The integrated assembly according to claim 17, wherein the flow passage portion comprises a port portion, and the first module is connected to the port portion through a connecting pipe, and the port portion comprises two lateral port portions and a port for connecting to the fluid assembly, wherein one of the lateral port portions is welded to the lateral port portion of the first module through a connecting pipe; the first module comprises a sensing element port portion, at least three valve connecting portions and an external port portion.

19. The integrated assembly according to claim 18, wherein the port portion comprises a first port portion and a second port portion, the first module is connected to one of the first port portion and the second port portion through a connecting pipe, one of the first port portion and the second port portion comprises two heat exchanging ports and two lateral port portions, and the other one of the first port portion and the second port portion comprises two lateral port portions and a port for connecting to the fluid assembly, and the first port portion is connected to the second port portion through a connecting pipe.

20. The integrated assembly according to claim 14, wherein an opening of the valve connecting portion is arranged away from the reinforcing portion, the port of the external port portion is also arranged away from the reinforcing portion, the first module is provided with two lateral port portions, and the connecting portion is a connecting pipe, and the first module is connected to and in communication with other modules and/or two of the port portions, respectively, through the connecting pipe, and the connecting pipes connected to the first module are connected to one of the lateral port portions, respectively, and the connecting pipe is fixed to the lateral port portion by welding;

the chamber of the valve connecting portion of the first module is each in communication with at least one of the communicating portions of the first module, and the communicating portion of the first module is each in communication with the chamber of one of the valve connecting portions of the first module.

\* \* \* \* \*